United States Patent

[11] 3,615,353

[72] Inventor Harold A. Mahoney
24 Wellsford St., Pittsburgh, Pa. 15213
[21] Appl. No. 713,346
[22] Filed Mar. 15, 1968
[45] Patented Oct. 26, 1971
Continuation-in-part of application Ser. No. 501,516, Oct. 22, 1965, now abandoned.

[54] APPARATUS AND PROCESS OF SMELTING SCRAP
17 Claims, 13 Drawing Figs.
[52] U.S. Cl. .................................................. 75/43,
75/44, 75/63, 266/11, 266/34
[51] Int. Cl. ................................................ C21b 13/00
[50] Field of Search ......................................... 75/43, 44,
63; 266/34, 11

[56] References Cited
UNITED STATES PATENTS

| | | | |
|---|---|---|---|
| 2,512,578 | 6/1950 | Jordan........................ | 75/44 X |
| 2,962,277 | 11/1960 | Morrill........................ | 75/60 |
| 3,234,010 | 2/1966 | Mahoney..................... | 75/43 |
| 3,287,006 | 11/1966 | Kai et al....................... | 75/44 X |
| 3,313,618 | 11/1967 | Feinman et al. .............. | 75/60 |

Primary Examiner—L. Dewayne Rutledge
Assistant Examiner—G. K. White
Attorney—John Mahoney ABSTRACT: A water-cooled inclined smelter for loose or baled scrap metal coated with finely divided or beneficiated iron ore and sprayed with coke and a slag forming material. When baled, the flux and slag are applied to the top edge portions and partly overlie the sides of the bales. At a substantial distance below the entrance of the smelter, a pipe extends through the top wall of the smelter through which molten pig iron is passed onto the scrap between the edges of the flux and slag forming material. A lance extends through the top of the smelter below the pig iron pipe and has a central chamber through which a hydrocarbon and a separate water-cooled chamber through which oxygen are applied to the scrap metal. The hydrocarbon passing into contact with the hot metal scrap is cracked and the nascent carbon reacts with oxygen from the lance and in the ore and slag to form carbon monoxide and the oxygen, carbon, and carbon monoxide react in the presence of the hot metal scrap and the refractory lining of the furnace which act as catalysts to provide a temperature of iron approximately 5800 to 6000° F. The portion of the smelter below the lance is flared outwardly and is connected to a hearth which has one or more burners directed onto the molten metal and slag flowing through the shallow refinery to keep the metal and slag hot. The carbon monoxide generated in the smelter and the shallow refinery passes above the metal flowing downwardly through the inclined smelter to partially reduce the iron ore and is burned in a recuperator in heat exchange relation with air which air is passed to the burner or burners in the hearth to support combustion. The smelter is substantially closed to extraneous air and as the carbon monoxide is burned in the recuperator, a slight vacuum is formed in the smelter lessens the amount of oxygen that is required. Phosphorus and sulfur pass into the slag in the shallow refinery and at the high temperature, molten copper and other heavy nonferrous metal settle below the steel and may be removed separately from the hearth.

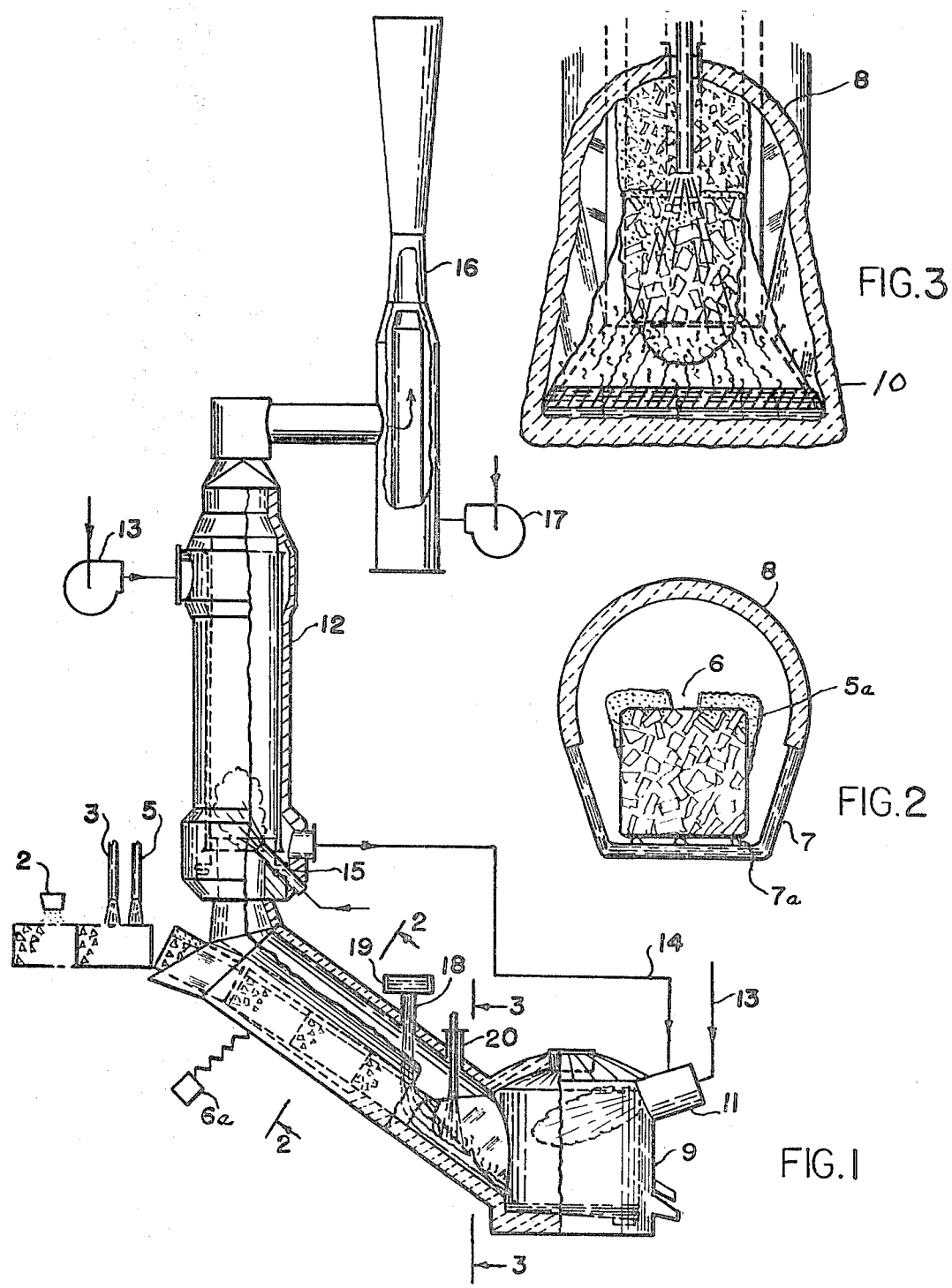

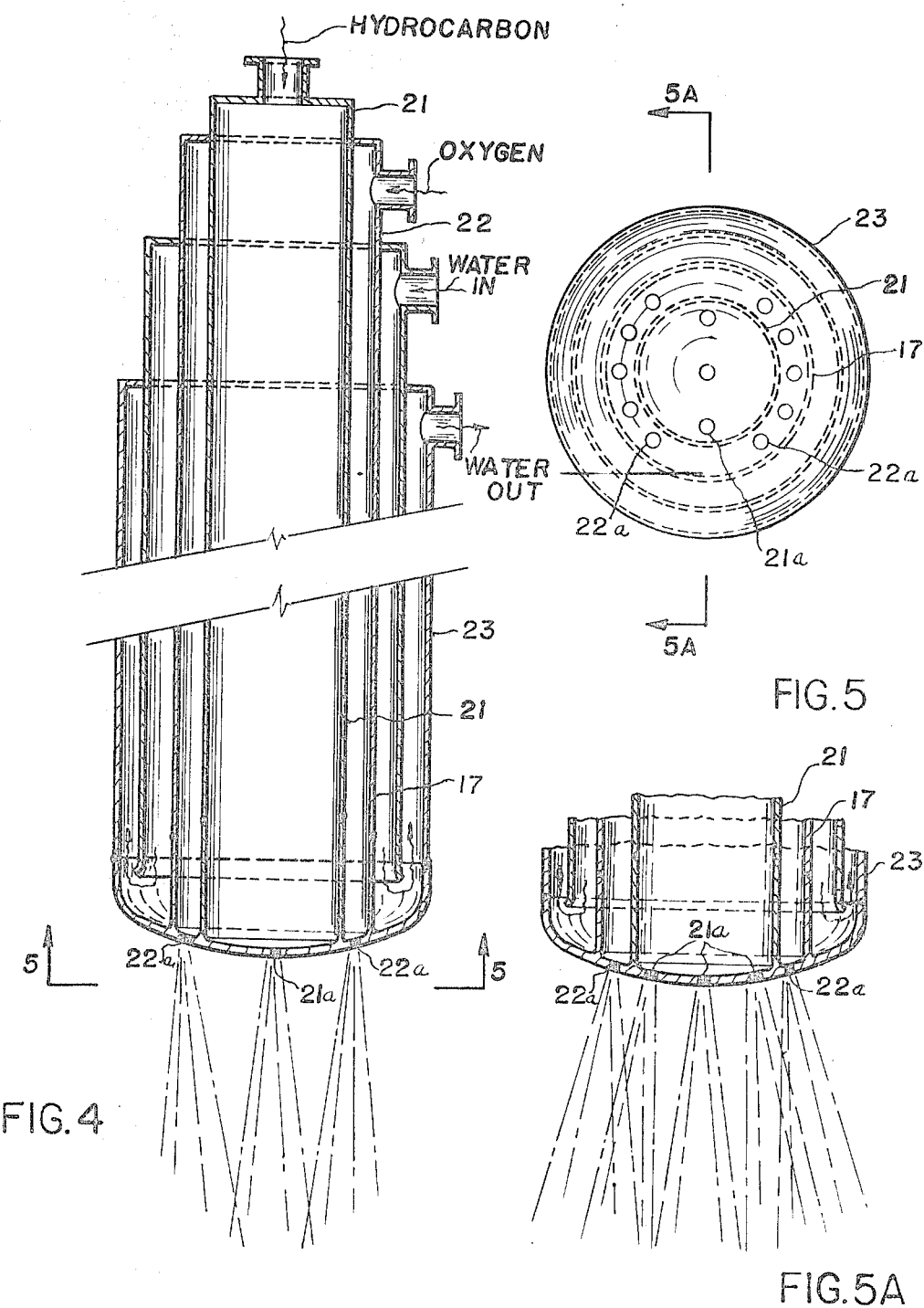

POUNDS OF COPPER PER AUTO BODY

IRON COPPER DIAGRAM

APPARATUS AND PROCESS OF SMELTING SCRAP

The present invention relates to an improved process of an an apparatus for preparing steel partly from metal scrap coated with an iron ore or an beneficiated iron ore and partly from molten metal, such as pig iron prepared in a cupola or blast furnace and is a continuation-in-part of my application, Ser. No. 501,516 filed in the United States Patent Office on Oct. 22, 1965 which is now abandoned. It also relates to the process of recovering copper associated with iron or steel scrap.

In preparing steel in which oxygen is utilized for removing the desired amount of carbon from molten iron, it has heretofore been the practice to prepare steel by the batch process, such as in the basic oxygen furnace. Continuous casting systems, however, require a constant flow of steel of substantially constant temperature and substantially constant compositions which is substantially free from phosphorus and sulfur. Such requirements are difficult to meet when the molten steel is slowly dispensed from a ladle during the operation.

It is an object of the present invention to provide an improved scrap smelting system which may be utilized in conjunction with a continuous casting system to produce a low sulfur and phosphorus grade of steel. In accordance with the present invention, molten metal from a blast furnace or cupola may be continuously refined by introduction in the throat section of a smelter while simultaneously melting iron ore and metal scrap for use in the steel to provide a composition which is suitable for all forms of steel, such as steel utilized for rolling, drawing, or tube making.

It is therefore an object of the present invention to provide an improved smelter and process of continuously producing steel, partly from metal scrap and an iron ore or a beneficiated iron ore and partly from molten pig iron.

Another object of my invention is to provide an improved smelter for separating copper from that entrained in iron scrap.

A further object of my invention is to provide an improved apparatus and process of refining iron in a shallow bath of approximately 6 to 8 inches in depth to thus reduce the wear of the refractories in the refining zone.

A still further object of my invention is to provide a process of producing steel in a fluid bath at such high temperature that metals, such as copper, nickel and chromium, or two or more of such metals, are stratified at the high temperature obtained and consequently can be removed independently of each other and from the steel in a hearth, the atmosphere is which is maintained at a temperature of approximately 3200° Fahrenheit.

My invention will be better understood by reference to the accompanying drawings in which:

FIG. 1 is a view partly in elevation and partly in section of my improved apparatus with parts shown diagrammatically;

FIG. 2 is a cross-sectional view taken on a plane passing through the line 2—2 of FIG. 1;

FIG. 3 is a cross-sectional view taken on a plane passing through the line 3—3 of FIG. 1;

FIG. 4 is a cross-sectional view of a lance extending through the throat portion of the inclined stack;

FIG. 5 is a plan view of the bottom of the lance showing the pattern of the nozzles through which the oxygen and hydrocarbon gas pass to provide a thermocouple reaction which attacks the plastic scrap, the pig iron, the molten slag material, and ore;

FIG. 5A is a fragmentary cross-sectional view taken on a plane passing through the 5A—5A of FIG. 5;

Figure 9:
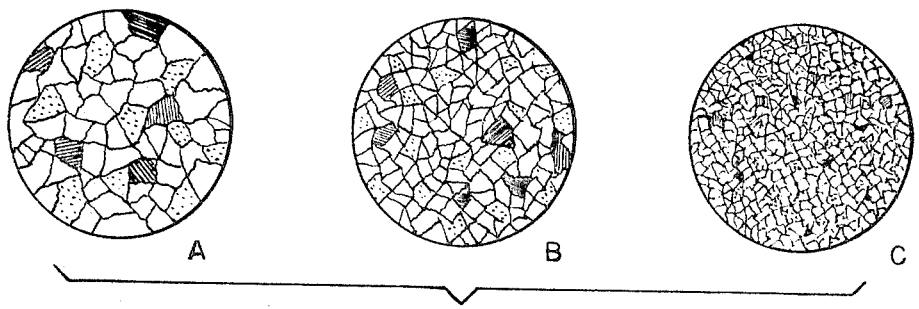
Figure 10:
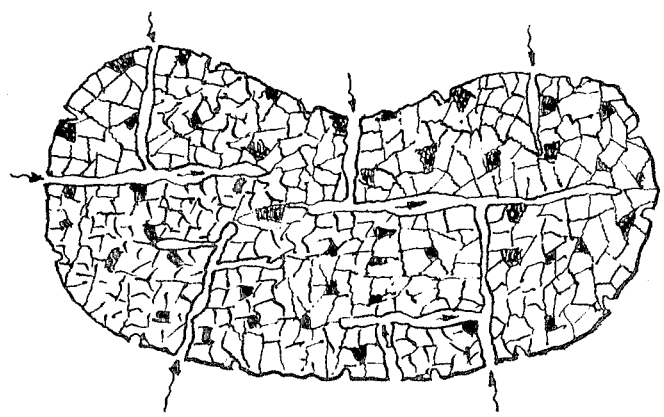
Figure 11:
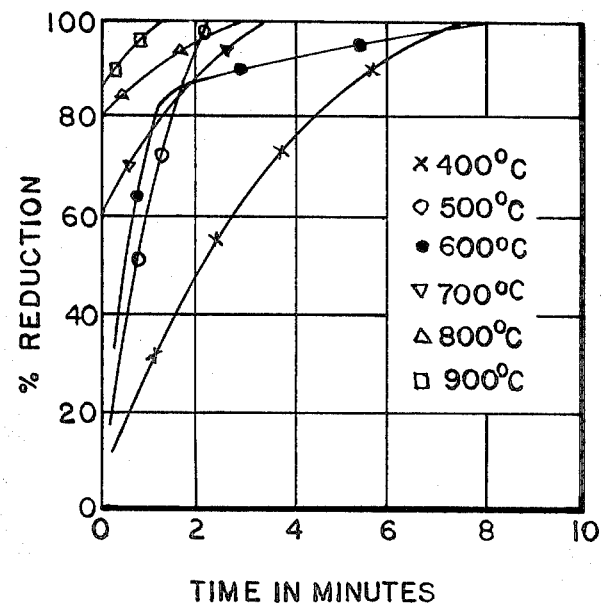
Figure 12:
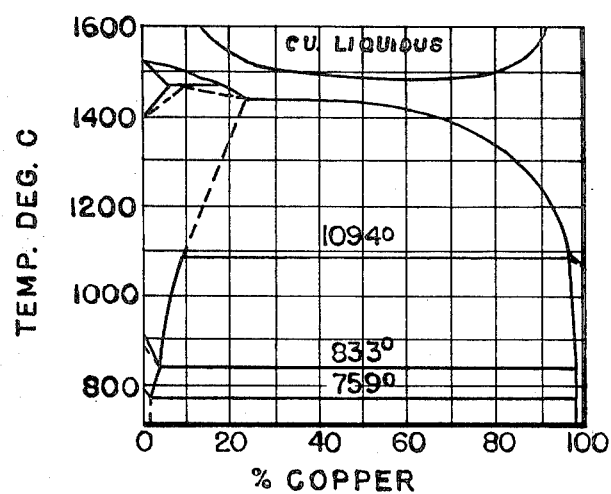

FIG. 9 shows photomicrographs of steel made from 100 percent iron ore shown at A, steel made from 50 percent iron scrap and 50 percent finely divided iron ore as shown at B, and steel made from 100 percent steel scrap as shown at C by my improved process;

FIG. 10 is a grain of beneficiated magnetic enlarged 800 times and being small enough to pass through a −325 mesh screen which has been attached by the nascent carbon in removing oxygen from the grain during my improved process;

FIG. 11 is a diagram showing the percent isolation of copper from entrained scrap, and FIG. 12 is an equilibrium diagram showing the temperature at which copper may be stratified and separated from steel.

As illustrated in the drawings, my improved apparatus includes an inclined stack in the form of a smelter 1 for receiving scrap which may be in the form of small pieces as shown in FIG. 1 of my copending application Ser. No. 501,516 or the scrap may be in the form of bales as shown in FIG. 1 of the present application. The scrap may be in the form of a metal, such as iron, nickel, copper or chromium, or a mixture of two or more of such metals. Before being passed through the smelter, the scrap or bales containing the scrap may be coated as indicated by the numeral 2 with finely divided iron ore or beneficiated iron ore containing 50 percent or more of metal although finely divided iron ore may be used in which the metal content is as low as 27 percent of finely divided ore or as low as 7 percent of finely divided ore when the scrap being treated is of a nonferrous material. The beneficiated ore for coating bales of the scrap should be in a finely divided state. It should, for instance, be small enough so that approximately 85 percent of it is capable of passing through a minus 325 mesh screen.

Before passing the coated scrap in the form of bales downwardly through the smelter, they are first coated with an aqueous slurry of a slag forming material, such as lime, which may be passed through the tubes 3 and 5. The slag slurry may also and preferably does contain coke. The slag forming material and the coke may be applied to the bales in any suitable manner. They may, for instance, be sprayed over the top of the bales from which they flow downwardly along the sides of the bales as indicated by the numerals 5 and 5a in FIG. 2 but leave an uncoated strip throughout the full length of each of the bales as indicated by the numeral 6. The bales may be assisted in their downward travel through the stack by electrical vibrators designated by the numeral 6a.

As illustrated in FIG. 2, the smelter is formed of a refractory material. Its lower portion is substantially trapezoidal in shape as indicated by the numeral 7 and its upper portion is substantially semicircular in shape as indicated by the numeral 8. As shown, the bottom wall preferably has upwardly extending ribs 7a on which the bales slide. The lower portion of the stack is secured to or formed integral with a hearth 9 and is flared outwardly at its bottom portion below the lance as indicated by the numeral 10 to increase the refractory generating area and to permit carbon monoxide gas generated thereon to rise through the molten bath and pass through the semicircular portion of the stack.

The hearth 9 normally contains molten metal and a combustible gas from a burner 11 is directed on to the metal flowing through the shallow area of the stack. The products of combustion from burner 11 also pass upwardly above the bales and aid in heating them. As the bales containing scrap and beneficiated iron ore pass downwardly through the stack toward the hearth, they are heated by carbon monoxide gas passing from the hearth and the throat portion of the stack which flows counter current to the travel of the bales through the upper semicircular portion of the stack to partially reduce the oxygen in the ore passing downwardly through the stack. In accordance with my invention, the gas after passing above and through the bales is passed into a recuperator 12 which is utilized to heat air passed by means of a fan 13 in heat exchange relation with the hot gases passing through the recuperator. The heated air is then passed to burner 11 through a suitable conduit means 14 to provide combustion air for burning the fuel passing through a conduit means 13 leading to burner 11. Although only a single burner is shown, two or more burners may be utilized if desired.

The gases passing through the upper portion of the stack removes the moisture from the slag forming and coke slurries and seals the coke and slag-forming material into the bales. Oxygen having a plurality of approximately 75 percent may be supplied to a burner 15 to provide combustion for the carbon monoxide gases passing through the recuperator, thus providing additional heat to the incoming combustion air. The spent gases may then be passed to a venturi-type exhauster 16, an air directing fan 17 being provided for blowing the spent gases to the atmosphere.

In accordance with my invention, means are provided for introducing molten pig iron containing the usual amount of carbon, such as approximately 4 percent, into the inclined stack or smelter. For this purpose, a tube designated by the numeral 18 is passed through the roof of the smelter and has an enlarged cavity 19 arranged above the roof of the smelter into which molten pig iron from a cupola or blast furnace may be passed into contact with the bales between the layers of coke and slag forming materials. At a short distance below the area in which the molten metal flows against the bales, a lance designated generally by the numeral 20 is provided which extends through the roof of the stack into the lower portion of the throat and which is inclined in a direction corresponding to the downward travel of the bales. As shown, the scrap metal with the iron ore sealed thereon is in a substantially plastic state because it encounters the high temperature of the gases flowing counter current thereto from the throat of the smelter and the hearth.

The lance may be of the type shown in FIGS. 4, 5 and 5A and consists of a central casing 21 as shown in FIG. 4 which terminates in nozzles 21a through which three streams of hydrocarbon gas flows, and surrounding the central casing is a second casing 22 through which oxygen is passed and which has outlet nozzles designated by the numerals 22a. The hydrocarbon gas may contain small amounts of carbon monoxide or carbon dioxide. It may, for instance, be natural gas, methane, ethane, propane, or blast furnace gas. The amount of the hydrocarbon gas required to reduce a specific amount of ore or scrap will depend on the hydrocarbon than is used. A preferred hydrocarbon is one having a low sulfur content. To preserve the lance from the high heat obtained, a casing 23 surrounding the oxygen casing which is secured to the roof of the stack may be provided through which water may be passed. The lower portion of the lance may be formed of copper as indicated in FIG. 5A which may be silver soldered or otherwise secured to the stainless steel casing of which the lance is formed so that it may be easily replaced when the openings become enlarged.

To provide high speed melting of the scrap, the hydrocarbon which is in the gaseous state is conveyed through the central casing in the lance as shown in FIGS. 4, 5 and 5A at a pressure of about 35 to 60 pounds per square inch and at the ambient temperature surrounding the hearth and is directed into the hot plastic scrap that is now glowing red at the exposed parts from which the sealed coating of slurry additions thereon have been removed by the molten pig iron. When the hydrocarbon strikes these exposed area at the high temperature predominant in close proximity thereto as shown at A in FIG. 7, the hydrocarbon is immediately cracked into carbon and hydrogen. Some of the carbon is removed by the oxygen emanating from the nozzles 22a of the lance to form carbon monoxide. Further, the nascent carbon also reacts with the oxygen in the iron ore to form carbon dioxide which then reacts with additional nascent carbon to from carbon monoxide. Carbon monoxide is also available from the reaction of carbon with the flux and by the reaction of the carbon in the pig iron with the oxygen.

In my improved process the generation of carbon monoxide can occur at two places; namely, the refractory area including the upper area created by the plastic sheet approaching the lance area. This solid iron area furnishes the right kind of surface for the evolution of dissolved carbon monoxide. The cracks and crevices of the refractory areas remote from the slag bath furnishes the other carbon monoxide generating surfaces. The introduction of the lime from the bales at the lance area furnishes carbon dioxide to provide a flushing action to help liberate carbon monoxide.

Other factors in my invention relate to a faster carbon drop than that related to other oxygen blowing systems. My process is sealed from atmospheric air and may be operated at slight vacuum causing the nucleation of the carbon monoxide bubbles at lower pressures. The shallow bath in the lance area is also void of a heavy slag blanket causing the ferrostatic head of the steel to be quite low which greatly adds to the rapid liberation of dissolved carbon monoxide from the steel.

This carbon-oxygen reaction has a built-in flexibility to automatically correct its equilibrium and the reaction $C + O \rightarrow CO$ can move from left to right to supply its own deficiency.

Figure 7:
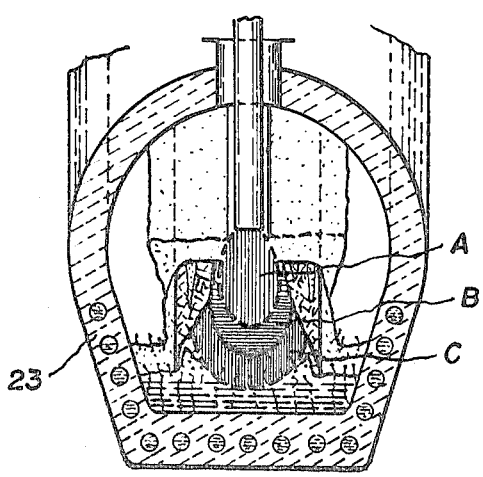
FIG. 7 is a cross-sectional view taken on a plane passing through the line 7—7 of FIG. 6.

The danger of excessive heat liberation and temperature rise in the burning zone is minimized by the fact that simultaneous reduction of the iron ore takes place which is highly endothermic and absorbs a substantial amount of the heat liberated. The reaction between the oxygen of which the latter B in FIG. 7 shows the maximum area, and the hydrogen and carbon monoxide that is present is catalyzed by the hot metal carrier to form temperatures ranging from approximately 5000° to 6000° Fahrenheit as shown in the area C in FIG. 7. A temperature of approximately 5800° to 6000° Fahrenheit is preferred. This thermochemical reaction is produced by the gases contracting the glowing red hot metal surfaces which act as a catalyst carrier.

In my improved smelter, it is advantageous to convert the $Fe_2O_3$ of the ore to at least FeO but not to metallic iron in the reduction zone. In this respect, combustion gases from the throat if the stack reduces the $Fe_2O_3$ to FeO. In the first stage, the iron ore $Fe_2O_3$ is reduced to FeO at a temperature of approximately 1300° to 1500° Fahrenheit although temperatures of 1200° to 1800° Fahrenheit may also be used. The FeO then flows past the lance where its reduction to metallic iron is completed substantially instantaneously and then joins the metal in the hearth.

The catalytic action which takes place by the use of a lance having separate chambers for the passage of oxygen and a hydrocarbon is based upon the principle that gaseous combustion is accelerated or is catalyzed by a solid metal surface. Such a system has numerous advantages over the use of hydrocarbon as a fuel in the presence of air. For instance, in my improved process very high temperatures may be attained without the use of elaborate devices for preheating the gas or air and heat transmission is very rapid because of the large amount of radiant energy involved. Combustion may also be concentrated where it is desired.

Shelves of sheet scrap become exposed incandescently as they approach the lance on which surface combustion takes place. The slag-forming materials have by this time become molten and flow along side of the scrap bundle to later engulf the molten steel in a fresh hot highly liquid slag as shown in FIGS. 3 and 7. Oxygen diffusion in a slag is much slower than in a metal bath. Therefore much higher refining speed is effected by direct oxygen blowing on the top of the metal as shown in the drawing. The upper limit of oxygen transfer is determined to be when each oxygen molecule hitting the metal surface is absorbed by the bath. The refining rate is normally controlled by the rate of oxygen transfer into the metal bath. Direct contact of oxygen with the surface of the liquid metal bath gives the maximum oxygen input rate. The theoretical upper limit of this step is shown to be 8,470 cubic feet per minute/per square foot, per unit time per unit area of exposed interface.

In my improved process no FeO fumes pass through the smelter because of the thermal precipitation from the hotter gases to the cooler scrap and the ore and less than half as much oxygen is blown per ton of steel refined as in other processes. The oxygen blowing is at a constant rate at all times and because of the shallow bath and multiple nozzles, heating of the metal interface requires lower blowing velocities. No other type of apparatus is capable of performing in such shallow baths. Oxidation of the scrap is further lessened by the addition of coke mixed with or applied to the scrap at the start of the charge. The coke is protected from gasification in the passage by being enclosed in a slurry blanket.

As the molten scrap and the flux reach the lower end of the stack, they flow into the hearth and stratify into layers. Because of the high temperature of the combustion gases passing from the hearth and the reducing gas from the lower portion of the stack passing through the circular portion of the stack, the stack is formed of refractory material and the lower portion of the smelter is cooled with water as indicated by the numeral 23a shown in FIG. 6. The introduction of water into the lower portion of the smelter is shown more particularly in patent Ser. No. 3,234,010 granted to me on Feb. 8, 1966.

The spreading out of the metal and slag at the lower portion of the throat provides a shallow area ranging from approximately 6 to 8 inches in depth which permits the metal to give up its oxides to the slag during passage into the hearth. It also permits phosphorus and sulfur to pass into the hot slag and be retained which slag passes into the hearth and is continuously dispensed through a tap 24 in the hearth. Metals, such as copper, chromium and nickel, which are heavier than steel and completely stratify in the liquidus stage therefrom at high temperatures may also be removed through a tap 25 and the steel may be continuously removed through a tap 26 from the hearth.

Figure 8:
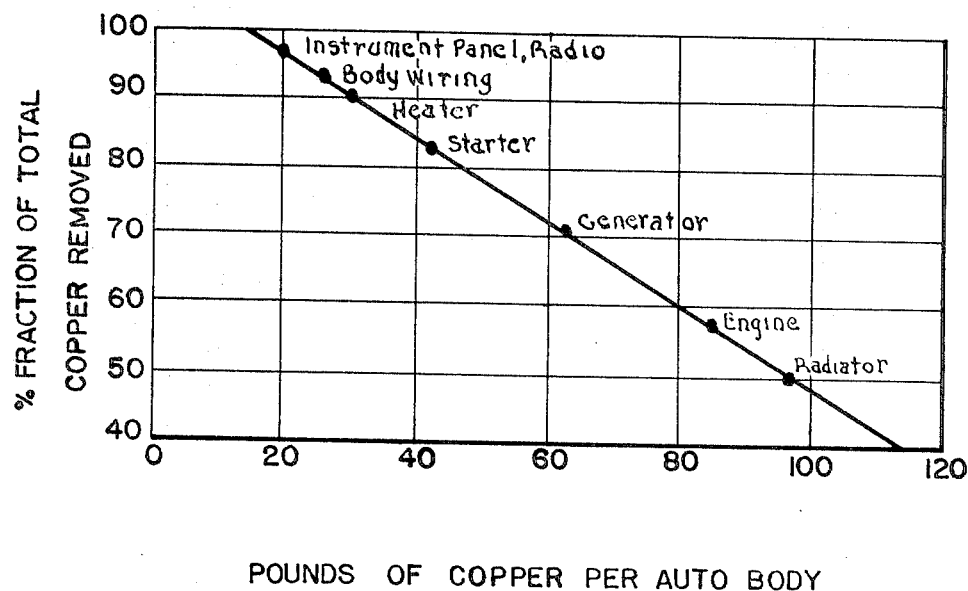
FIG. 8 is a diagram showing the amount of copper originally mechanically entrained with scrap that may be isolated and separated from the scrap in my improved process.

My invention is particularly adapted for preparing and separating copper from small pieces of copper scrap mechanically entrained with iron and steel scrap. The scrap may, for example, be in the body of an abandoned automobile which may contain approximately 100 pounds of copper. As shown in FIG. 8, the copper may be present in the instrument panel, the radiator, the heater, starter, generator and engine. Scrap of such type which is entrained with iron or steel is first bound into bales and coated with finely divided iron ore or a finely divided beneficiated iron ore containing 27 percent to 50 percent of iron which is applied to the bales through the container 2 as shown in FIG. 1. An aqueous slurry of coke and an aqueous slurry of a slag-forming material, such as lime, is then sprayed upon the bales, leaving an uncoated strip at the center portion of each bale as designated by the numeral 6 in FIG. 2. The bales are then passed downwardly in the stack and molten pig iron is introduced on to the uncoated portion of the bales through the pipe 18 from the container 19 which receives the pig iron from a suitable source, such as a cupola or blast furnace. In the meantime carbon monoxide generated at the throat passes above the bales to reduce the iron oxide to FeO. The bales then flow below the lance 20 and the hydrocarbon striking the uncoated central portion of the bales is cracked at the high temperature forming hydrogen and carbon. The nascent carbon reacts with the finely divided iron ore to remove oxygen therefrom which penetrates lineally through the finely divided ore to effect instant reduction therein as shown in FIG. 10. The carbon also reacts with the lime in the slag forming carbon monoxide which carbon monoxide reacts with oxygen and hydrogen in the presence of the reduced iron to provide a temperature ranging from 5000° to 6000° Fahrenheit which melts the steel and copper scrap substantially instantaneously.

Figure 6:
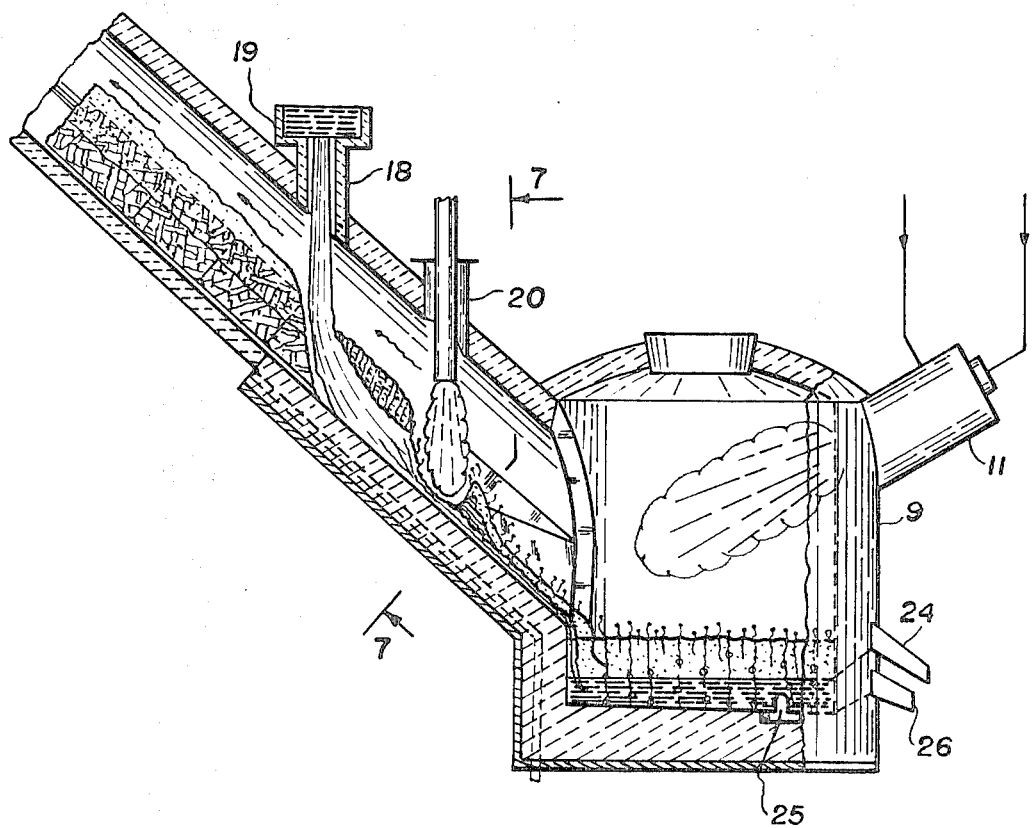
FIG. 6 is an enlarged cross-sectional view of the hearth and a portion of the stack.

In the shallow portion of the inclined smelter, the free carbon monoxide escapes from the slag bath in the shallow area in the throat of the smelter and from the slag in the hearth and aids in reducing the iron oxide as it flows counter current to the downward movement of the bales. The temperature of the hearth is maintained at approximately 3200° Fahrenheit. At temperatures between approximately 1500° and 1600° Centigrade, the copper separates from the iron or steel as shown in FIG. 11 and having a higher specific gravity than the iron or steel settles to the bottom of the hearth and may be drawn off through the tap 25. In such case, the slag may be continuously drawn from the hearth through the slag notch 24 and the steel which may be used in continuous casting operations may be continuously drawn from the hearth through the tap 26. Carbon monoxide gas in the form of bubbles, having thus been formed in the crevices of the refractory refining area and on the surfaces of the now plastic sheet and emanating from the slag in the throat as shown in FIGS. 1, 2 and 7, and similar bubbles emanating from the slag in the hearth, are shown in FIG. 6 and pass upwardly in the semicircular portion of the smelter to preheat and partially reduce the iron ore coating of the scrap.

Steel made from 100 percent iron ore is shown in FIG. 9A; from 50 percent iron ore and 50 percent steel scrap is shown in FIG. 9B, and from 100 percent steel scrap is shown in FIG. 9C. The time in minutes for reducing the iron ore to its molten state is shown in FIG. 11 at various temperatures and as previously stated, the temperature at which copper stratifies from steel scrap and forms the liquidus stage is shown in FIG. 12.

What is claimed is:

1. The process of treating metal scrap to recover the metal therein which comprises coating the scrap with finely divided iron ore, applying an aqueous slurry of a slug-forming material and coke to the coated scrap, passing the scrap through a downwardly inclined smelter through which a hot reducing gas flows in a counter direction, passing molten metal against the scrap, and then passing the scrap below a lance having a chamber through which a hydrocarbon and a chamber through which oxygen flows against the coated scrap metal to thereby crack the hydrocarbon to form carbon and hydrogen which carbon reacts with oxygen issuing from the lance and oxygen in the iron ore and flux to form carbon monoxide which reacts with the oxygen and hydrogen in the presence of hot metal surfaces to provide a comparatively high temperature to melt the scrap, and then passing the molten metal into a hearth.

2. The process as defined in claim 1 in which the scrap metal is in the form of bales.

3. The process as defined in claim 2 in which the slurry of slag-forming material and coke is sprayed upon side margins at the top of each bale, leaving an uncoated central strip extending lengthwise of the middle of each bale.

4. The process as defined in claim 1 in which the iron ore is in a finely divided beneficiated state containing at least 50 percent iron.

5. The process as defined in claim 1 in which the scrap is in the form of a nonferrous material.

6. The process as defined in claim 1 in which the scrap is in the form of copper entrained with ferrous scrap material.

7. The process as defined in claim 1 in which the inclined smelter is flared outwardly at its bottom portion below the lance to form a shallow refinery for metal passing to the bottom portion of the smelter.

8. The process as defined in claim 7 in which excess carbon monoxide formed by the reaction of carbon with the iron ore and the reaction of the oxygen with the carbon in the pig iron passes over the bales of metal scrap passing downwardly through the smelter to partially reduce the oxygen in the iron ore.

9. The process as defined in claim 7 in which the smelter is formed of a refractory material and in which the enlarged area provides a refinery where the reaction between the carbon monoxide, hydrogen and oxygen takes place in the presence of a hot metal surface, thus providing a thermochemical reaction developing a temperature ranging from approximately 5000° to 6000° Fahrenheit.

10. The process as defined in claim 7 in which a burner is arranged in the hearth, the flame of which is directed against metal flowing through the flared portion of the smelter to super heat the slag and molten metal flowing thereto and to super heat the metal and slag in the earth.

11. The process as defined in claim 2 in which the reducing gas is carbon monoxide which flows above the bales of scrap into a recuperator, passing a gas containing oxygen into the recuperator for burning the carbon monoxide, passing air in heat exchange relation with the recuperator, and then passing the heated air to the burner extending into the hearth to support combustion of fuel supplied to the burner.

12. Apparatus for recovering metal from metal scrap including an inclined smelter for receiving scrap in the form of small pieces, means for coating the scrap with a finely divided iron ore, means for applying a slurry of a slag-forming material and coke to the scrap, means for providing a reducing gas which flows counterwise above the metal scrap passing downwardly through the smelter, means for passing molten metal upon the top of the scrap as the scrap is passed downwardly through the smelter, a lance extending through the roof of the smelter having a compartment for receiving a hydrocarbon and a compartment for receiving oxygen which hydrocarbon is cracked by the hot metal to form carbon and hydrogen which carbon reacts with the iron ore to form carbon monoxide to thus obtain a mixture of carbon monoxide, hydrogen and oxygen which react in the presence of the hot metal to provide a comparatively high temperature to melt the scrap and slag at the lower portion of the smelter, and to provide at least part of the reducing gas which flows over the downwardly descending scrap, and a hearth connected to the lower portion of the smelter into which the molten metal and slag from the smelter flows.

13. Apparatus as defined in claim 12 in which the scrap is in the form of bales and the means for applying the slag-forming material to the bales is arranged to coat the side margins of the top of the bales with the slag forming material, leaving an uncoated central strip, and the container and pipe for the pig iron is arranged so that the molten pig iron strikes each of the bales at the uncoated strip.

14. Apparatus as defined in claim 12 in which the lower portion of the smelter is flared outwardly at the portion which engages the hearth to form a shallow layer for molten metal and slag.

15. Apparatus as defined in claim 12 in which the smelter has an upper semicircular portion in which excess carbon monoxide formed by the reaction of carbon monoxide, hydrogen, and oxygen flows upwardly from the lower portion of the smelter and the slag in the hearth and passes through the semicircular portion of the smelter where it is cooled by the downwardly flowing scrap metal to provide a partial vacuum.

16. Apparatus as defined in claim 15 including a recuperator into which the excess carbon monoxide from the slag and smelter flows, a burner extending into the recuperator, means for passing oxygen into the burner in the recuperator for burning the carbon monoxide, means for passing air in heat exchange relation with the recuperator, and conduit means for passing the air heated by the recuperator to the burner extending into the hearth.

17. Apparatus for treating metal scrap in the form of bales as defined in claim 12 in which said lance has a central casing for receiving a hydrocarbon and having aligned exit nozzles for passing the hydrocarbon gas against the scrap metal bales and said lance including a second casing surrounding the first casing through which oxygen may be passed, said oxygen casing having a series of arcuately arranged nozzles through which oxygen is passed which surrounds the hydrocarbon gas and which forms a fan-shaped pattern which attacks the narrow width of each of the bales are passed beneath the lance.

UNITED STATES PATENT OFFICE
CERTIFICATE OF CORRECTION

Patent No. 3,615,353  Dated October 26, 1971

Inventor(s) Harold A. Mahony

It is certified that error appears in the above-identified patent and that said Letters Patent are hereby corrected as shown below:

On the cover sheet, [72] the inventor's name should read -- Harold A. Mahony --. In [56], the reference cited to "Mahoney" should read -- Mahony --. Column 1, line 3, "an" should read -- and --; line 5, "an", second occurrence, should read -- a --; line 48, "is", first occurrence, should read -- of --; line 64, "thermocouple" should read -- thermochemical --. Column 2, line 6, "magnetic" should read -- magnetite --; line 3, "attached" should read -- attacked --; Column 3, line 8, "plurality" should read -- purity --; line 44, "than" should read -- that --. Column 4, line 32, "contracting" should read -- contacting --.

Signed and sealed this 21st day of November 1972.

(SEAL)
Attest:

EDWARD M. FLETCHER, JR.
Attesting Officer

ROBERT GOTTSCHALK
Commissioner of Patents